US011034584B1

(12) United States Patent
Baboukani et al.

(10) Patent No.: US 11,034,584 B1
(45) Date of Patent: Jun. 15, 2021

(54) BIPOLAR EXFOLIATION AND DEPOSITION OF PHOSPHORENE ONTO NEGATIVE FEEDING ELECTRODE

(71) Applicants: Amin Rabiei Baboukani, Miami, FL (US); Iman Khakpour, Miami, FL (US); Chunlei Wang, Miami, FL (US); Vadym Drozd, Miami, FL (US); Anis Allagui, Sharjah (AE)

(72) Inventors: Amin Rabiei Baboukani, Miami, FL (US); Iman Khakpour, Miami, FL (US); Chunlei Wang, Miami, FL (US); Vadym Drozd, Miami, FL (US); Anis Allagui, Sharjah (AE)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 17/015,235

(22) Filed: Sep. 9, 2020

(51) Int. Cl.
| | |
|---|---|
| *C01B 25/02* | (2006.01) |
| *C01B 25/00* | (2006.01) |
| *C25B 15/02* | (2021.01) |
| *C25B 11/036* | (2021.01) |
| *B82Y 30/00* | (2011.01) |
| *B82Y 40/00* | (2011.01) |

(52) U.S. Cl.
CPC ............ *C01B 25/02* (2013.01); *C01B 25/003* (2013.01); *C25B 11/036* (2021.01); *C25B 15/02* (2013.01); *B82Y 30/00* (2013.01); *B82Y 40/00* (2013.01)

(58) Field of Classification Search
None
See application file for complete search history.

(56) References Cited

U.S. PATENT DOCUMENTS 10,676,357 B1 * 6/2020 Baboukani .............. C25B 9/063

OTHER PUBLICATIONS

Mayorga-Martinez etal., "Black Phosphorus Nanoparticle Labels for Immunoassays via Hydrogen Evolution Reaction Mediation," Anal. Chem. 2016, 88, 10074-10079. (Year: 2016).*
Amin Rabiei Baboukani et al., Single-step exfoliation of black phosphorus and deposition of phosphorene via bipolar electrochemistry for capacitive energy storage application, J. Mater. Chem. A, 2019, 7, 25548-25556.

* cited by examiner

*Primary Examiner* — Nicholas A Smith
(74) *Attorney, Agent, or Firm* — Saliwanchik, Lloyd & Eisenschenk

(57) ABSTRACT

Single-step, inexpensive, scalable, and eco-friendly methods and systems for exfoliation and deposition of 2D reduced phosphorene nanosheets are provided, as well as deposited phosphorene nanosheets with high specific capacitance. The exfoliation and deposition can be in situ and can include exfoliation from bulk black phosphorus (BP) into a solvent and deposition onto a negative feeding electrode. The positive feeding electrode can be a noble metal, such as a platinum wire.

16 Claims, 5 Drawing Sheets

BIPOLAR EXFOLIATION AND DEPOSITION OF PHOSPHORENE ONTO NEGATIVE FEEDING ELECTRODE

BACKGROUND

Black phosphorus (BP) has recently captured attention due to its promising physical and chemical properties. Similar to graphite, strong covalent bonds (phosphorus-phosphorus bonds in BP) in each layer of BP form a puckered honeycomb structure, and neighboring layered BP nanosheets (known as phosphorene) adhere together with weak van der Waals interlayer interactions. BP is the thermodynamically stable allotrope of phosphorus under ambient conditions. It is a layered material that can be exfoliated into a monolayer two-dimensional (2D) material similar to graphene. As a rising star in 2D materials, few-layer phosphorene is considered a strong competitor against other 2D materials.

In general, the fabrication of phosphorene can be categorized into top-down and bottom-up methods. Among the top-down approaches, mechanical exfoliation and liquid exfoliation are the most popular. However, low efficiency, use of environmentally unfriendly organic solvents, and long-term sonication process time can lead to many structural defects in the resulting phosphorene nanosheets. Obtaining few-layer BP by direct chemical synthesis is not typically considered, due to its air instability. Among various liquid-phase exfoliation methods, electrochemical exfoliation has emerged as an attractive approach for exfoliating 2D materials with high quality and high yields. However, it a multi-step and time-consuming procedure, and is thus less attractive for practical applications.

BRIEF SUMMARY

Embodiments of the subject invention provide single-step, inexpensive, scalable, and eco-friendly methods and systems for exfoliation and deposition of phosphorene nanosheets (e.g., two-dimensional (2D) phosphorene nanosheets), as well as phosphorene nanosheets with excellent energy storage characteristics (e.g., high specific capacitance). The exfoliation and deposition can be in situ and can include exfoliation from bulk black phosphorus (BP) into a solvent (e.g., deionized water with no added salts or other additives) and deposition onto a negative feeding electrode. The positive feeding electrode can be a noble metal (e.g., platinum (Pt)), and it can be, for example, a wire of the noble metal.

In an embodiment, a system for single-step, in situ exfoliation of multi-layer bulk black phosphorus and deposition into one or more phosphorene nanolayers can comprise: a negative feeding electrode; a positive feeding electrode electrically connected to the negative driving electrode through an external power supply, at least one bipolar electrode comprising the multi-layer bulk black phosphorus; and a solvent in physical contact with the negative feeding electrode, the negative feeding electrode, and the at least one bipolar electrode. The positive feeding electrode can be a noble metal electrode (e.g., a noble metal wire). The noble metal electrode can be a platinum electrode (e.g., a platinum wire). The negative feeding electrode can be, for example, stainless steel. The solvent can be deionized water without salts (or any other additives). An electric field between the negative feeding electrode and the positive feeding electrode can be configured such that a first end of the at least one bipolar electrode is turned into a positive pole and a second end of the at least one bipolar electrode opposite from the first end is turned into a negative pole, where the first end of the at least one bipolar electrode is closer to the negative feeding electrode than the second end is and the second end of the at least one bipolar electrode is closer to the positive feeding electrode than the first end is. The system can be configured such that the one or more phosphorene nanolayers are deposited on the negative feeding electrode. The at least one bipolar electrode can be physically separated from, and not in physical contact with, the external power supply.

In another embodiment, a method of single-step, in situ exfoliation of multi-layer bulk black phosphorus and deposition into one or more phosphorene nanolayers can comprise: a) providing a system comprising: a negative feeding electrode; a positive feeding electrode electrically connected to the negative driving electrode through an external power supply; at least one bipolar electrode comprising the multi-layer bulk black phosphorus; and a solvent in physical contact with the negative feeding electrode, the negative feeding electrode, and the at least one bipolar electrode; and b) applying a voltage, using the external power supply, to the negative feeding electrode and the positive feeding electrode to turn a first end of the at least one bipolar electrode into a positive pole and a second end of the at least one bipolar electrode opposite from the first end into a negative pole, such that the multi-layer bulk black phosphorus is exfoliated into the solvent and deposited into the one or more phosphorene nanolayers on the negative feeding electrode. The first end of the at least one bipolar electrode can be closer to the negative feeding electrode than the second end is, and the second end of the at least one bipolar electrode can be closer to the positive feeding electrode than the first end is. The exfoliating of the multi-layer bulk black phosphorus and the depositing into the one or more phosphorene nanolayers on the negative feeding electrode can be performed simultaneously. The positive feeding electrode can be a noble metal electrode (e.g., a noble metal wire). The noble metal electrode can be a platinum electrode (e.g., a platinum wire). The negative feeding electrode can be, for example, stainless steel. The solvent can be deionized water without salts (or any other additives). The at least one bipolar electrode can be physically separated from, and not in physical contact with, the external power supply.

In another embodiment, 2D reduced phosphorene nanosheets fabricated using a system and/or method as described herein can have high specific capacitance. For example, the 2D phosphorene nanosheets can have a specific capacitance of at least 10 milliFarads per square centimeter ($mF/cm^2$) at a scan rate of 2 milliVolts per second (mV/s) and/or a specific capacitance of at least 2.5 $mF/cm^2$ at a scan rate of 1000 mV/s.

DETAILED DESCRIPTION

Embodiments of the subject invention provide single-step, inexpensive, scalable, and eco-friendly methods and systems for exfoliation and deposition of phosphorene nanosheets (e.g., two-dimensional (2D) phosphorene nanosheets), as well as phosphorene nanosheets with excellent energy storage characteristics (e.g., high specific capacitance). The exfoliation and deposition can be in situ and can include exfoliation from bulk black phosphorus (BP) into a solvent (e.g., deionized water with no added salts or other additives) and deposition onto a negative feeding electrode. The positive feeding electrode can be a noble metal (e.g., platinum (Pt)), and it can be, for example, a wire of the noble metal.

Figure 1:
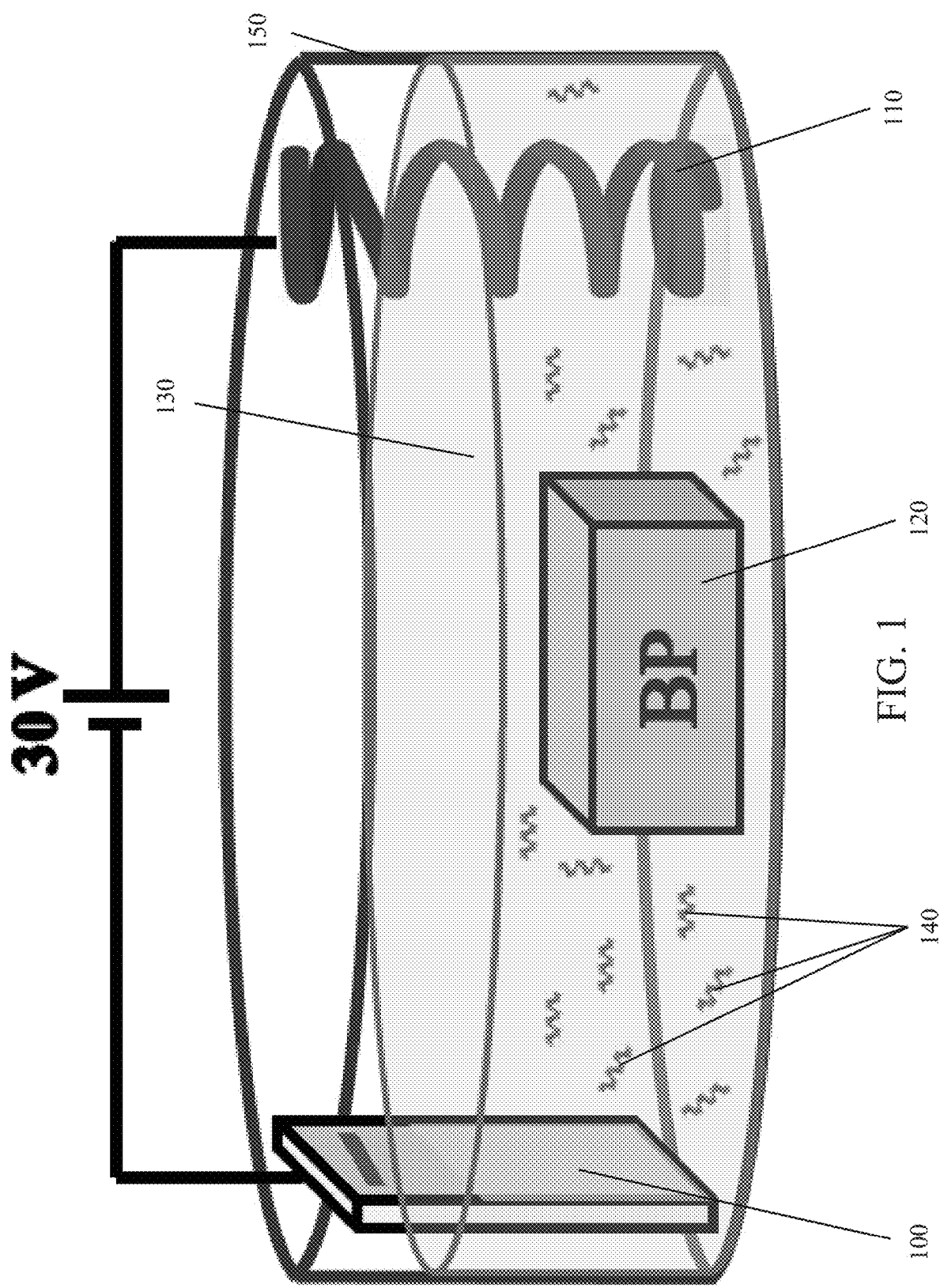
FIG. 1 is a schematic diagram of an exfoliation system for deposition of exfoliated two-dimensional (2D) reduced phosphorene nanosheets, according to an embodiment of the subject invention. The deposition can occur on the negative feeding electrode via modified bipolar electrochemistry.

FIG. 1 is a schematic diagram of an exfoliation system for deposition of exfoliated 2D reduced phosphorene nanosheets, according to an embodiment of the subject invention. Referring to FIG. 1, a modified bipolar electrochemistry (BPE) setup can be used, in which a conductive substrate can serve as a negative feeding electrode 100 and a noble metal (e.g., Pt) substrate (e.g., a wire) can serve as a positive feeding electrode 110. The negative 100 and positive 110 electrodes can be placed apart from each other in a solvent 130, and bulk BP 120 can be placed between them in a horizontal direction parallel to a lower surface of the container 150 in which the solvent 130 is contained. The solvent 130 can be, for example, deionized water (without salts or any other additives). A voltage (e.g., a direct current (DC) voltage) can be applied on the negative 100 and positive 110 feeding electrodes. Though FIG. 1 shows 30 V as the voltage, this is for exemplary purposes only and should not be construed as limiting. The actual applied voltage can be determined based on providing a sufficient electric field on the two poles of the black phosphorus for the exfoliation and deposition of phosphorene. The thickness of the reduced phosphorene deposition also depends on the time of the process (i.e., for how long the voltage is applied while the bulk BP 120 is in the solvent 130). A noble metal can be used as the positive feeding electrode 110 in order to prevent or inhibit any undesired reaction or participation of other species in the process and to ensure the exfoliation and deposition of reduced phosphorene nanosheets on the negative feeding electrode 100.

The induced voltage on the two poles of the bulk BP 120 depends on the applied voltage, the length of the bulk BP 120 (acting as an electrode), and the distance between the two feeding electrodes 100,110. By applying a higher voltage, using a longer bulk BP, and/or decreasing the distance between the two feeding electrodes, the induced voltage will increase. When applying the voltage, the extremities of the bulk BP substrate across the direction of the electric field get polarized in the opposite polarity to the feeding electrodes resulting in the wireless compartmentalization of the bulk BP into anodic and cathodic poles (that is, the left side of the bulk BP 120 as depicted in FIG. 1 gets polarized to positive, and the right side of the bulk BP 120 as depicted in FIG. 1 gets polarized to negative). The bulk BP 120 remains at almost isopotential during the process due to its conductivity. When the bipolar potential is large enough, hydrogen and oxygen bubbles can be generated at the surface of the negative and positive poles, respectively, of the bulk BP as a result of the water electrolysis reaction. Then, this water decomposition can overcome the weak van der Waals forces of BP layers. Therefore, 2D reduced phosphorene particles can be detached and exfoliated from the bulk BP 120. These detached and exfoliated BP particles 140 are depicted in the solvent 130 in FIG. 1. Due to the voltage electrophoresis phenomenon, exfoliated reduced phosphorene nanosheets are transported and deposited on the negative feeding electrode 100. The negative feeding electrode 100 can be, for example, stainless steel.

The single-step, inexpensive, scalable, and eco-friendly deposition methods of embodiments of the subject invention provide uniform (or nearly-uniform) reduced phosphorene nanosheets with 2D morphology on the negative feeding electrode. This was confirmed with scanning electron microscope (SEM) images and other tests (see Example 1). The reduced phosphorene nanosheets deposited on the negative feeding electrode, according to embodiments of the subject invention, have excellent energy storage characteristics that are not attainable by related art methods. The phosphorene nanosheets can have a specific capacitance of, for example, at least 10 milliFarads per square centimeter ($mF/cm^2$) at a scan rate of 2 milliVolts per second (mV/s) (e.g., a specific capacitance of 11 $mF/cm^2$ at a scan rate of 2 mV/s). The non-toxic, straightforward, and inexpensive exfoliation and deposition methods of embodiments of the subject invention provide phosphorene nanosheets with excellent characteristics for energy storage and biomedical applications, and the methods could be applied for other 2D materials (e.g., graphene, boron nitride (BN), MXenes, $MoS_2$) for energy storage and biomedical applications as well.

The phosphorene nanosheets can have a specific capacitance, at a scan rate of 2 mV/s, of any of the following values, at least any of the following values, about any of the following values, or at most any of the following values (all values are in $mF/cm^2$): 5, 6, 7, 8, 9, 10, 11, 12, or 13.

The phosphorene nanosheets can have a specific capacitance, at a scan rate of 5 mV/s, of any of the following values, at least any of the following values, about any of the following values, or at most any of the following values (all values are in $mF/cm^2$): 5, 6, 7, 8, 8.5, 8.57, 9, or 10. For example, the phosphorene nanosheets can have a specific capacitance, at a scan rate of 5 mV/s, of 8.57 $mF/cm^2$.

The phosphorene nanosheets can have a specific capacitance, at a scan rate of 10 mV/s, of any of the following values, at least any of the following values, about any of the following values, or at most any of the following values (all values are in $mF/cm^2$): 5, 6, 7, 7.5, 7.62, 8, 9, or 10. For example, the phosphorene nanosheets can have a specific capacitance, at a scan rate of 10 mV/s, of 7.62 $mF/cm^2$.

The phosphorene nanosheets can have a specific capacitance, at a scan rate of 20 mV/s, of any of the following values, at least any of the following values, about any of the following values, or at most any of the following values (all values are in $mF/cm^2$): 5, 6, 6.5, 6.66, 7, 8, 9, or 10. For example, the phosphorene nanosheets can have a specific capacitance, at a scan rate of 20 mV/s, of 6.66 $mF/cm^2$.

The phosphorene nanosheets can have a specific capacitance, at a scan rate of 50 mV/s, of any of the following values, at least any of the following values, about any of the following values, or at most any of the following values (all values are in $mF/cm^2$): 3, 4, 5, 6, 7, or 8. For example, the phosphorene nanosheets can have a specific capacitance, at a scan rate of 50 mV/s, of 5.0 $mF/cm^2$.

The phosphorene nanosheets can have a specific capacitance, at a scan rate of 100 mV/s, of any of the following values, at least any of the following values, about any of the following values, or at most any of the following values (all values are in $mF/cm^2$): 3, 4, 4.5, 4.65, 5, 6, 7, or 8. For example, the phosphorene nanosheets can have a specific capacitance, at a scan rate of 100 mV/s, of 4.65 $mF/cm^2$.

The phosphorene nanosheets can have a specific capacitance, at a scan rate of 200 mV/s, of any of the following values, at least any of the following values, about any of the following values, or at most any of the following values (all values are in $mF/cm^2$): 2, 3, 4, 4.01, 5, or 6. For example, the phosphorene nanosheets can have a specific capacitance, at a scan rate of 200 mV/s, of 4.01 $mF/cm^2$.

The phosphorene nanosheets can have a specific capacitance, at a scan rate of 500 mV/s, of any of the following values, at least any of the following values, about any of the following values, or at most any of the following values (all values are in $mF/cm^2$): 1, 2, 3, 3.32, 4, 5, or 6. For example, the phosphorene nanosheets can have a specific capacitance, at a scan rate of 500 mV/s, of 3.32 $mF/cm^2$.

The phosphorene nanosheets can have a specific capacitance, at a scan rate of 1000 mV/s, of any of the following values, at least any of the following values, about any of the following values, or at most any of the following values (all values are in $mF/cm^2$): 1, 2, 2.5, 2.8, 2.86, 3, 4, or 5. For example, the phosphorene nanosheets can have a specific capacitance, at a scan rate of 1000 mV/s, of 2.86 $mF/cm^2$.

In related art methods, preparation of phosphorene nanosheets is a multi-step process, in which exfoliation of bulk BP occurs in one step and then the nanosheets are collected for further material and electrochemical analysis. Embodiments of the subject invention can advantageously fabricate and deposit phosphorene nanosheets on substrates in a facile, single-step, scalable, and eco-friendly manner. The deposited phosphorene nanosheets can be particularly useful for energy storage devices.

The realization of the properties and applications of phosphorene nanosheets depend on the development and optimization of fabrication methods. Fabricating phosphorene nanosheets with a high level of quality, uniformity, and reproducibility is of crucial importance for its large-scale application; embodiments of the subject invention achieve these.

Compared to related art top-down and bottom-up techniques for the deposition of exfoliated reduced phosphorene nanosheets, the modified BPE methods of embodiments of the subject invention advantageously provide a single-step, inexpensive, scalable, and eco-friendly deposition. In addition, the reduced phosphorene nanosheets deposited on the negative feeding electrode of the bipolar setup show a 2D morphology. The bulk material is provided in the solvent (e.g., deionized water (without any salt or other additives)) to decrease the degradation rate of synthesized nanosheets. In certain embodiments, additional material can be provided to exfoliate and passivate on the surface of the deposited reduced phosphorene nanosheets in order to ensure the presence of a stable layer on the conductive substrate (i.e., the negative feeding electrode).

U.S. Pat. No. 10,676,357, which is hereby incorporated by reference herein in its entirety, provides a straightforward two-in-one process to exfoliate bulk BP into phosphorene nanosheets in deionized (DI) water, which are then dragged electrophoretically to be deposited on the positive feeding electrode. The procedure is based on the mechanism of BPE, which is based on applying a sufficiently high voltage to generate electrochemical reactions between two feeding electrodes and a conductive bipolar electrode placed wirelessly between them. The difference in the electric potential between the solution and the bipolar electrode drive redox reactions on the cathodic and anodic poles of the bipolar electrode. U.S. Pat. No. 10,676,357 provides successful exfoliation of 2D phosphorene nanosheets via BPE. Baboukani et al. (Single-Step Exfoliation of Black Phosphorus and Deposition of Phosphorene via Bipolar Electrochemistry for Capacitive Energy Storage Application, Journal of Materials Chemistry A, 7(44), 25548-25556, 2019) also discusses the process of U.S. Pat. No. 10,676,357. Baboukani et al. is hereby incorporated by reference herein in its entirety.

Compared to U.S. Pat. No. 10,676,357 and Baboukani et al., embodiments of the subject invention provide fabrication and deposition of reduced phosphorene nanosheets on the negative feeding electrode through a modified BPE technique, and the reduced phosphorene nanosheets have excellent characteristics for energy storage applications in particular. The reduced phosphorene nanosheets deposited on the negative feeding electrode of the bipolar setup exhibit outstanding energy storage performance. No known prior art method exists for a one-step synthesis and deposition of reduced phosphorene nanosheets with 2D morphology through exfoliation techniques for capacitive energy storage devices.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

A system as shown in FIG. 1 was used for single-step exfoliation and deposition of 2D reduced phosphorene nanosheets from bulk BP. A Pt wire was used as the positive electrode, and the solvent was deionized water with no salts or other additives added. A voltage of 30 V was applied to the feeding electrodes for a period of 24 hours.

Figures 2A, 2B:
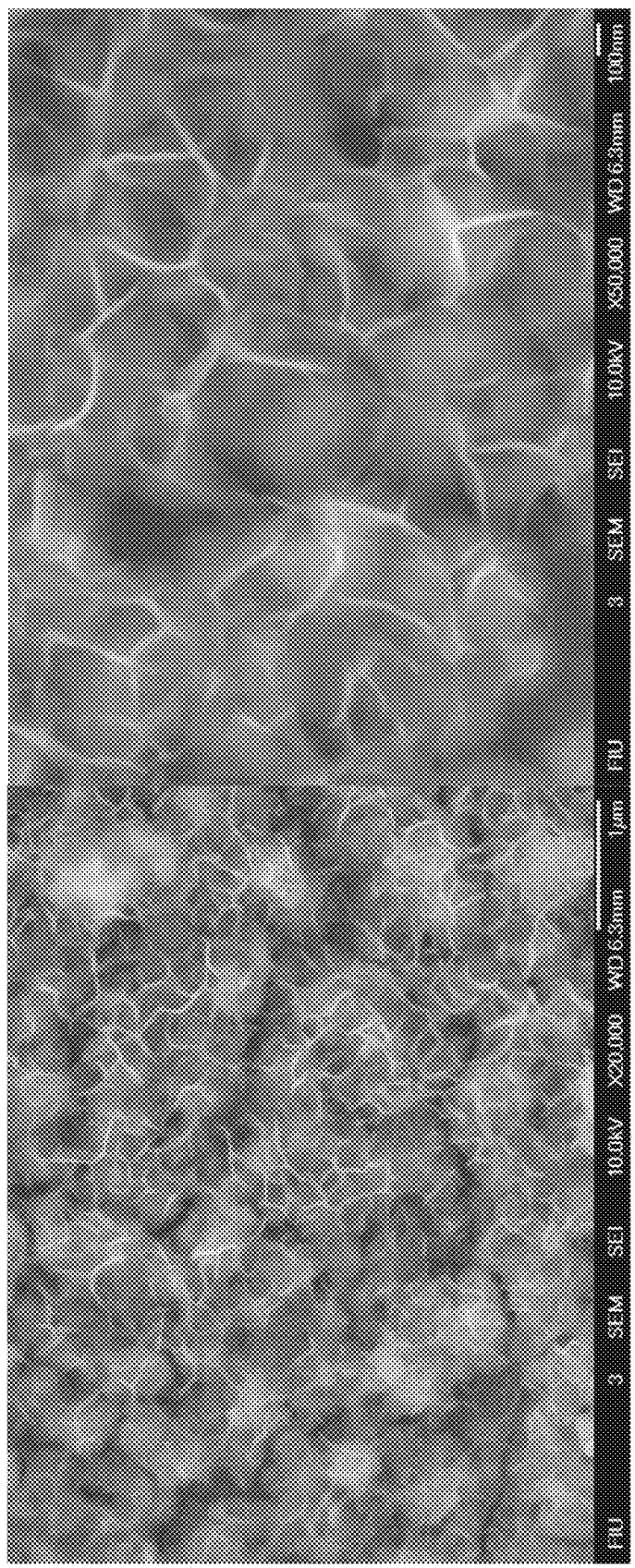
FIG. 2A is a scanning electron microscope (SEM) image of phosphorene nanosheets deposited on a negative feeding electrode, according to an embodiment of the subject invention. The scale bar is 1 µm.
FIG. 2B is a higher magnification SEM image of the deposited phosphorene nanosheets of FIG. 2A. The scale bar is 100 nm.
Figure 3:
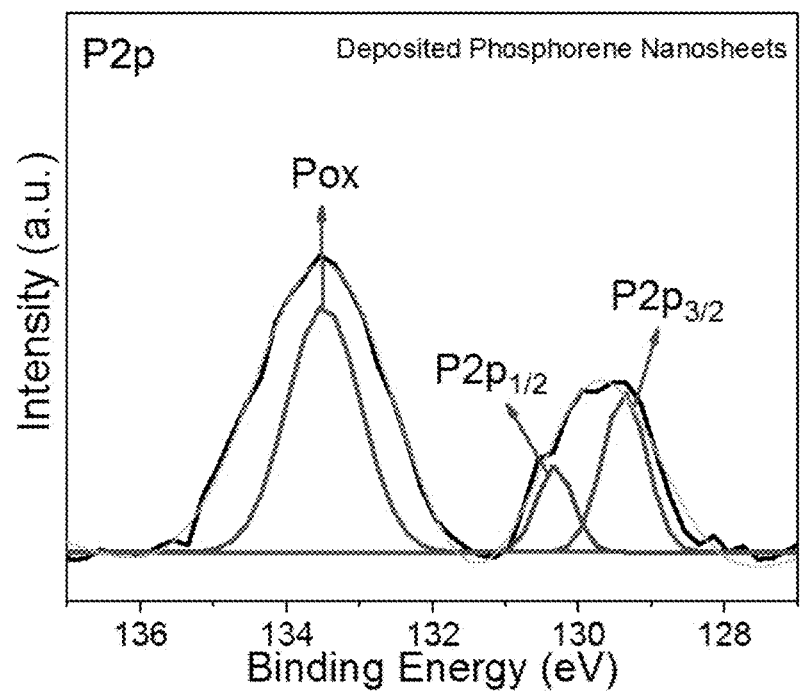
FIG. 3 is a plot of intensity (in arbitrary units (a.u.)) versus binding energy (in electron Volts (eV)) showing phosphorus to phosphorus (P2P) X-ray photoelectron spectroscopy (XPS) spectra of phosphorene nanosheets deposited on a negative feeding electrode, according to an embodiment of the subject invention.
Figure 4:
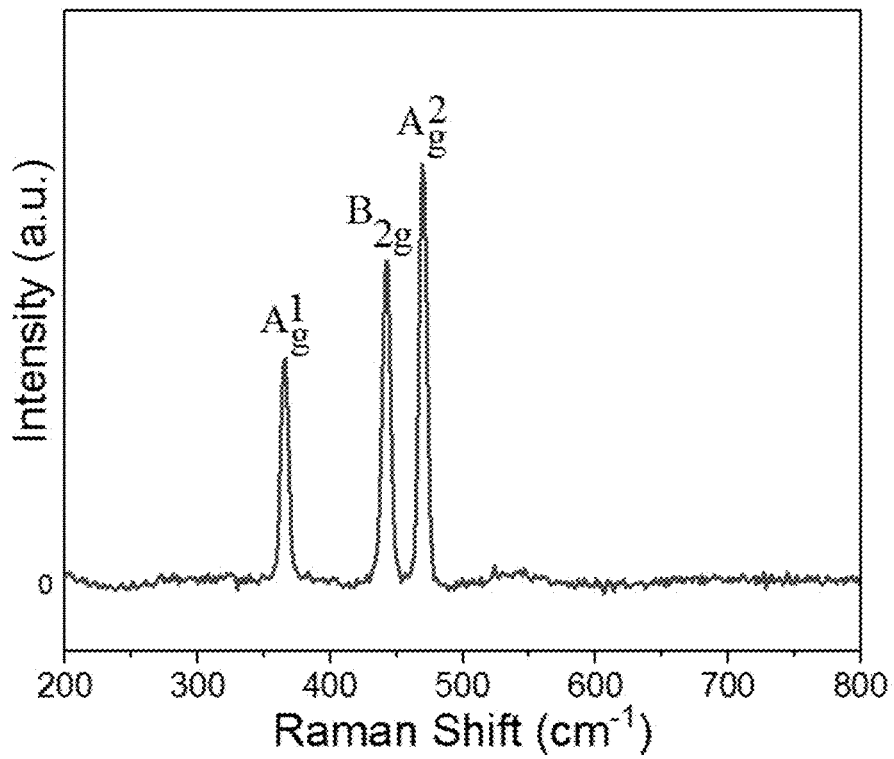
FIG. 4 is a plot of intensity (in a.u.) versus Raman shift (in 1/centimeters ($cm^{-1}$)) showing Raman spectra of phosphorene nanosheets deposited on a negative feeding electrode, according to an embodiment of the subject invention.

After 24 hours, the bulk BP did not show any noticeable change; however, deposition of a thin film on the negative electrode of the bipolar cell could be observed, and this thin film was the 2D reduced phosphorene nanosheet(s). FIGS. 2A and 2B (higher magnification) show SEM images of the negative feeding electrode that confirm the presence of 2D reduced phosphorene nanosheets, which were uniformly deposited on the negative feeding electrode. FIG. 3 shows phosphorus to phosphorus (P2P) XPS spectra of the phosphorene nanosheets deposited on the negative feeding electrode, and FIG. 4 shows the Raman spectra of the phosphorene nanosheets deposited on the negative feeding electrode. The results (e.g., FIGS. 2A, 2B, 3, and 4) confirm the straightforward, single-step, non-toxic, and scalable deposition of exfoliated high-quality reduced phosphorene nanosheets on the conductive substrate (negative feeding electrode) via the modified BPE method.

Figure 5:
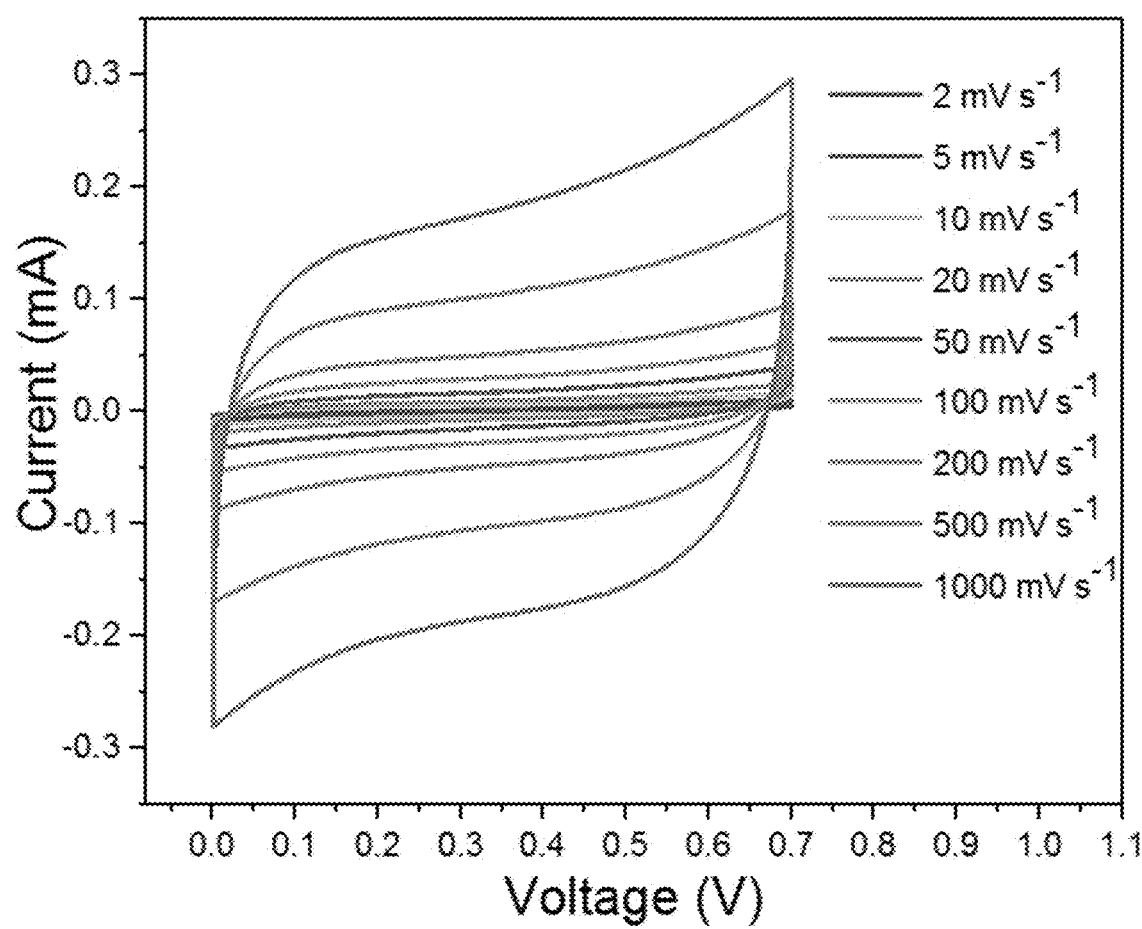
FIG. 5 is a plot of current (in milliAmps (mA)) versus voltage (in Volts (V)) showing the cyclic voltammetry profile of phosphorene nanosheets deposited on a negative feeding electrode, according to an embodiment of the subject invention. The cyclic curve that is both highest and lowest (i.e., on the outside of the curves) is for a scan rate of 1000 milliVolts per second (mV/s); the cyclic curve that is second-highest and second-lowest is for a scan rate of 500 mV/s; the cyclic curve that is third-highest and third-lowest is for a scan rate of 200 mV/s; the cyclic curve that is fourth-highest and fourth-lowest is for a scan rate of 100 mV/s; the cyclic curve that is fifth-highest and fifth-lowest is for a scan rate of 50 mV/s; the cyclic curve that is sixth-highest and sixth-lowest is for a scan rate of 20 mV/s; the cyclic curve that is seventh-highest and seventh-lowest is for a scan rate of 10 mV/s; the cyclic curve that is eighth-highest and eighth-lowest is for a scan rate of 5 mV/s; and the cyclic curve that is ninth-highest and ninth-lowest is for a scan rate of 2 mV/s.

Due to the 2D morphology of the exfoliated and deposited reduced phosphorene nanosheets on the negative feeding electrode, the electrochemical performance of the electrode was evaluated for energy storage applications in a two-electrode symmetric configuration. FIG. 5 shows the cyclic voltammetry profile of the deposited phosphorene nanosheets, and FIG. 6 shows the galvanostatic charging/discharging measurements of the deposited phosphorene nanosheets.

Figure 6:
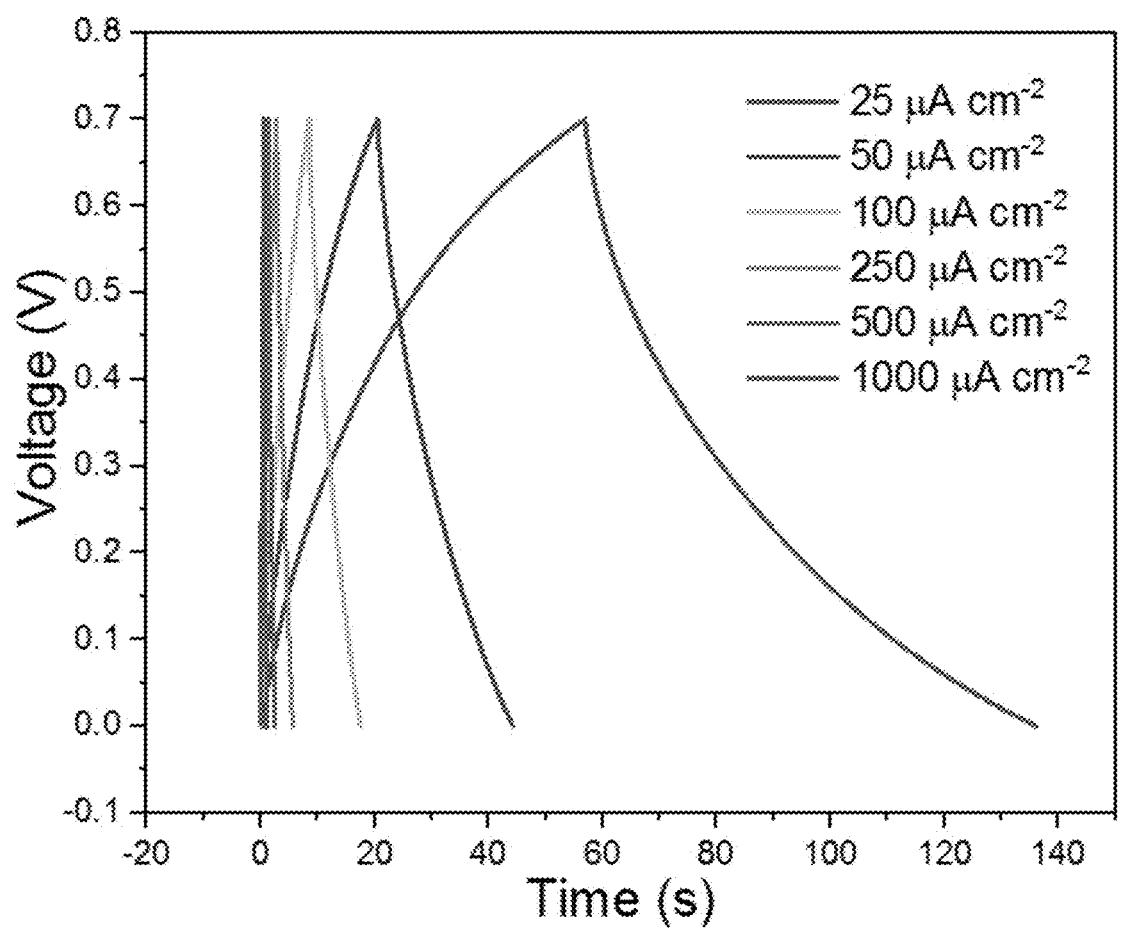
FIG. 6 is a plot of voltage (in V) versus time (in seconds (s)) showing galvanostatic charging/discharging measurements of phosphorene nanosheets deposited on a negative feeding electrode, according to an embodiment of the subject invention. The curve with its peak at 0.7 V at the highest time (around 60 s—first charging cycle) is for 25 microAmps per square centimeter ($\mu A/cm^2$); the curve with its peak at the second-highest time is for 50 $\mu A/cm^2$; the curve with its peak at the third-highest time is for 100 $\mu A/cm^2$; the curve with its peak at the fourth-highest time is for 250 $\mu A/cm^2$; the curve with its peak at the fifth-highest time is for 500 $\mu A/cm^2$; and the curve with its peak at the lowest time is for 1000 $\mu A/cm^2$.

Referring to FIGS. 5 and 6, the electrochemical performance of the deposited reduced phosphorene nanosheets was outstanding, with a specific capacitance of 11 $mF/cm^2$ at a scan rate of 2 mV/s, which is superior to 2D materials-based devices such as MXene, 2D $MnO_2$, graphene, and graphene oxide. The phosphorene nanosheets were fabricated by modified bipolar exfoliation, and the deposited reduced phosphorene nanosheets were characterized with different materials and electrochemical characterizations.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for single-step, in situ exfoliation of multi-layer bulk black phosphorus and deposition into one or more phosphorene nanolayers, the system comprising:
    a negative feeding electrode;
    a positive feeding electrode electrically connected to the negative driving feeding; electrode through an external power supply;
    at least one bipolar electrode comprising the multi-layer bulk black phosphorus; and
    a solvent in physical contact with the negative feeding electrode, the positive feeding electrode, and the at least one bipolar electrode,
    the positive feeding electrode being a noble metal electrode, and
    the negative feeding electrode being a stainless steel electrode.

2. The system according to claim 1, the noble metal electrode being a noble metal wire.

3. The system according to claim 2, the noble metal electrode being a platinum wire.

4. The system according to claim 1, the noble metal electrode being a platinum electrode.

5. The system according to claim 1, the solvent being deionized water without salts.

6. The system according to claim 1, an electric field between the negative feeding electrode and the positive feeding electrode being configured such that a first end of the at least one bipolar electrode is turned into a positive pole and a second end of the at least one bipolar electrode opposite from the first end is turned into a negative pole,
    the first end of the at least one bipolar electrode being closer to the negative feeding electrode than the second end is, and
    the second end of the at least one bipolar electrode being closer to the positive feeding electrode than the first end is.

7. The system according to claim 1, the system being configured such that the one or more phosphorene nanolayers are deposited on the negative feeding electrode.

8. The system according to claim 1, the at least one bipolar electrode being physically separated from, and not in physical contact with, the external power supply.

9. A method of single-step, in situ exfoliation of multi-layer bulk black phosphorus and deposition into one or more phosphorene nanolayers, the method comprising:
    providing a system comprising:
        a negative feeding electrode, the negative feeding electrode being a stainless steel electrode;
        a positive feeding electrode electrically connected to the negative feeding electrode through an external power supply, the positive feeding electrode being a noble metal electrode;
        at least one bipolar electrode comprising the multi-layer bulk black phosphorus; and
        a solvent in physical contact with the negative feeding electrode, the negative feeding electrode, and the at least one bipolar electrode; and
    applying a voltage, using the external power supply, to the negative feeding electrode and the positive feeding electrode to turn a first end of the at least one bipolar electrode into a positive pole and a second end of the at least one bipolar electrode opposite from the first end into a negative pole, such that the multi-layer bulk black phosphorus is exfoliated into the solvent and deposited into the one or more phosphorene nanolayers on the negative feeding electrode,
    the first end of the at least one bipolar electrode being closer to the negative feeding electrode than the second end is, and
    the second end of the at least one bipolar electrode being closer to the positive feeding electrode than the first end is.

10. The method according to claim 9, the exfoliating of the multi-layer bulk black phosphorus and the depositing into the one or more phosphorene nanolayers on the negative feeding electrode being performed simultaneously.

11. The method according to claim 9, the noble metal electrode being a noble metal wire.

12. The method according to claim 11, the noble metal electrode being a platinum wire.

13. The method according to claim 9, the noble metal electrode being a platinum electrode.

14. The method according to claim 9, the solvent being deionized water without salts.

15. The method according to claim 9, the at least one bipolar electrode being physically separated from, and not in physical contact with, the external power supply.

16. A method of single-step, in situ exfoliation of multi-layer bulk black phosphorus and deposition into one or more phosphorene nanolayers, the method comprising:

providing a system comprising:
    a negative feeding electrode, the negative feeding electrode being a stainless steel electrode;
    a positive feeding electrode electrically connected to the negative electrode through an external power supply, the positive feeding electrode being a noble metal electrode;
    at least one bipolar electrode comprising the multi-layer bulk black phosphorus; and
    a solvent in physical contact with the negative feeding electrode, the positive feeding electrode, and the at least one bipolar electrode; and applying a voltage, using the external power supply, to the negative feeding electrode and the positive feeding electrode to turn a first end of the at least one bipolar electrode into a positive pole and a second end of the at least one bipolar electrode opposite from the first end into a negative pole, such that the multi-layer bulk black phosphorus is exfoliated into the solvent and deposited into the one or more phosphorene nanolayers on the negative feeding electrode, the first end of the at least one bipolar electrode being closer to the negative feeding electrode than the second end is, the second end of the at least one bipolar electrode being closer to the positive feeding electrode than the first end is, the exfoliating of the multi-layer bulk black phosphorus and the depositing into the one or more phosphorene nanolayers on the negative feeding electrode being performed simultaneously, the noble metal electrode being a platinum wire, the solvent being deionized water without salts, and the at least one bipolar electrode being physically separated from, and not in physical contact with, the external power supply.

* * * * *